3,368,908
PROCESS FOR THE PREPARATION OF SQUID FILLETS

Beverly E. Williams, 716 N. La Grange Road, La Grange Park, Ill. 60525
No Drawing. Filed July 19, 1965, Ser. No. 473,213
4 Claims. (Cl. 99—111)

This invention relates to a process for the preparation of squid fillets for human consumtion.

In my United States Patent No 2,822,274, granted on Feb. 4, 1958, I described a process for preparation of squid fillets for human consumption which are substantially non-curling upon heating and cooking which process included the steps of cleaning and skinning the mantle of the squid, trimming the cleaned and skinned mantle to fillet shape, and then cutting and scoring the ligaments covering the flesh of the mantle by a plurality of spaced cuts extending in at least two mutually perpendicular directions so that substantially all of the ligaments are repeatedly severed into lengths of approximately ⅛ to ½ inch each. This process has proved entirely satisfactorily for most varieties of squid, and are particularly useful and efficient with fillets from squid found on the West Coast of the United States and particularly those squid abounding in Monterey Bay, Calif.

A much larger squid is found and caught in the waters off Newfoundland, around the Mediterranean area and off of Japan and South Korea. The latter has the common species name Surumeika. The fillets obtained from such squid are several times larger than the fillets from the squid obtained on the West Coast of the United States. The Japanese and South Korean squid, also known as *Ommastrephes solani pacificus* Steenstrup, have a thin membranous outer cover which is most difficult to remove and does not come off with the polka dot skin but remains adhered to the fillet. The large fillets from Japan and South Korea also have several strands of ligaments on the inside running the length of fillet, that is, from head to tail of the shellfish. Upon contact with heat these several ligament strands contract causing the fillet to curl into roll. The large fillets from these squid are too great in diameter and are too thin to be attractive in the raw frozen state and also present a packaging problem. However, when cooked they curl and shrink to about one-half or two-thirds their raw size and this is quite a disappointment for the chef or the housewife and for the consumer.

I have now found that if the fillets from the squid obtained from the Far Pacific, around Japan and South Korea are subjected to heat, preferably hot or boiling water, to a suitable hot fluid or to hot air for from 5 to 15 seconds that they will shrink in overall size and curl but in so doing will become much plumper. Thereafter the smaller diameter but plumper fillet is uncurled, flattened and then scored as described in my patent to provide a plumper, smaller diameter, more appetizing and attractive fillet which after dipping in batter and breading, is more readily packaged in acceptable sized boxes.

I have found that because of the membrane and ligamenst discussed above, these fillets should be scored clear through so that this elastic membrane, which has a tendency to give with knife blades and resist cutting, is perforated and the ligaments cut to minimize any curling that contraction of either or both might cause when the fillets are cooked.

By having the cutter blades of the rollers cut cleanly through the fillet including the tough, resistant membrane and the ligaments, I have found that the batter and breading will fill in the interstices making the breading adhere better during the cooking process. Filling the cuts or interstices in the fillets with batter and breading material also reduces shrinking and curling during cooking because these materials have a tendency to expand or swell and absorb the cooking oil or butter.

One of the principal objects of this invention is, therefore, to provide a process for the preparation of squid fillets for human consumption to render them tender and capable of being cooked by first shrinking the fillet to a smaller and plumper shape which can thereafter be cooked without change of the shape or size of the product.

Another object of this invention is to provide a novel process for the preparation of squid fillets which is a modification of the process of my patent above referred to in which the squid fillets are first reduced in overall size with increase in thickness and then processed as described in my patent for economically preparing these products for human consumption on a quantity basis.

Other objects and advantages of this invention will be readily apparent from the following detailed description of illustrative embodiments thereof.

Briefly, this invention comprises the discovery that the mantle of large squid, especially the Japanese and South Korean squid, can be simultaneously reduced in size and made plumper, tenderized and rendered non-curling upon cooking by first heat-shrinking the mantle and then mechanically treating the mantle. The mantle or white meat has a membranous cover overlying the meat portion of the mantle and a series of longitudinal ligaments. Upon heating or blanching of the mantle, as in cooking, the individual ligaments and the elastic membranous covering contract causing the mantle to curl and shrink. I have discovered that the large fillet produced from these mantles can be reduced in diameter and made plumper by first subjecting the fillet to boiling water for from 5 to 15 seconds and the fillet then rendered curl and shrink resistant by scoring the fillet clear through to cut not only the ligaments but also the elastic membranous covering so that cooking will influence only the immediate area surrounding each segment, if at all, with no cumulative contraction resulting in objectionable curling and shrinking. Cutting the ligaments makes the meat when cooked quite tender and scoring and filling the cuts with batter and breading material causes further swelling of the meat to produce a cooked fillet of increased thickness.

In carrying out the process of this invention, the squid are cleaned and skinned, leaving the sidewalls or mantles clean and trimmed to shape and size to produce ultimately a fillet of approximately 6″ x 8″ in size. The flat mantle is then subjected to boiling water for from 5 to 15 seconds and shrinks with some curling to a rectangular shape of approximately 4″ x 5″ in size but having increased thickness. The fillet is flattened and then subjected to a cutting or scoring treatment being cut or scored clear through the fillet, the elastic membrane and the ligaments to prevent recurling of the fillet when subjected to cooking. The flesh of the mantle is segmented by a plurality of spaced cuts extending in at least two mutually opposed or opposite perpendicular directions in such a manner that substantially all of the ligaments and the membranous covering are repeatedly severed into lengths of approximately ⅛ to ½″ each. A conventional seasoning or batter and breading is then applied to the surface of the scored fillet as is usual in the preparation of other fish products. The batter and breading fill the interstices created by the scoring. The fillet may be frozen and packaged for sale in the frozen state. Scoring the fillet clear through the meat, ligaments and membranous covering permits the steam which forms under the fillet during cooking to escape through these cuts for batter, more rapid and more uniform cooking because the fillets lie flat in the pan. The batter and breading will enter these cuts for better adherence thereto providing more uniform breading and battering of the fillet.

The fillets, so prepared, can be kept chilled for reasonably long periods and can be kept frozen for many months. They have an excellent appearance both before and after cooking, are plump and appetizing and cook quickly without a "fishy" smell. These fillets may be cooked in deep fat at about 350° F. for about a minute and one-half or cooked in a skillet in a film of fat or oil at "browning" heat for about two minutes per side. These fillets should not be overcooked and should be served piping hot.

Having fully described my invention, it is to be understood that I do not wish to be limited to the details set forth, but my invention is of the full scope of the appended claims.

What is claimed is:

1. In a process for preparing squid fillets for human consumption which are substantially non-curling upon heating and cooking, the steps of cleaning and skinning the mantle of the squid Surumeika, trimming the cleaned and skinned mantle to fillet shape, shrinking the mantle to approximately 4" x 5" in size with boiling water from 5 to 15 seconds with increase in thickness thereof, and then cutting and scoring the ligaments, membrane and flesh of the mantle by a plurality of spaced cuts clear through the mantle extending in at least two mutually opposed directions so that substantially all of the ligaments and the membranous covering are repeatedly scored, cut and severed into lengths of approximately ⅛ to ½" each.

2. A process as described in claim 1 including the steps of seasoning and breading the scored fillet.

3. A process as described in claim 1 including the steps of seasoning and breading the scored fillet and then freezing the breaded fillet.

4. A process for preparing squid fillets for human consumption which are substantially non-curling upon heating and cooking, the steps of shrinking the fillet to a roughly rectangular shape of approximately 4" x 5" with increase in thickness thereof by subjecting the fillet to hot fluid, hot air or hot water for from 5 to 15 seconds and then cutting and scoring the ligaments and the membrane covering the flesh of the cleaned and skinned mantle of the squid by a plurality of spaced cuts extending clear through the mantle in at least two mutually opposed directions so that substantially all of the ligaments and the membranous covering are repeatedly severed into lengths of approximately ⅛ to ½" each.

No references cited.

LIONEL M. SHAPIRO, *Primary Examiner.*